US007031986B2

(12) United States Patent
Ito (10) Patent No.: US 7,031,986 B2
(45) Date of Patent: Apr. 18, 2006

(54) DATABASE SYSTEM WITH BACKUP AND RECOVERY MECHANISMS

(75) Inventor: Atsuki Ito, Aichi (JP)

(73) Assignee: Fujitsu Limited, Kawasaki (JP)

( * ) Notice: Subject to any disclaimer, the term of this patent is extended or adjusted under 35 U.S.C. 154(b) by 293 days.

(21) Appl. No.: 09/815,055

(22) Filed: Mar. 23, 2001

(65) Prior Publication Data

US 2001/0056438 A1    Dec. 27, 2001

(30) Foreign Application Priority Data

Jun. 27, 2000    (JP)    ............................. 2000-192031

(51) Int. Cl.
    *G06F 12/00*    (2006.01)
(52) U.S. Cl. .......................... 707/204; 714/6
(58) Field of Classification Search ..................... 714/4, 714/6; 711/135; 707/8, 10, 209
    See application file for complete search history.

(56) References Cited

U.S. PATENT DOCUMENTS 5,864,657 A * 1/1999 Stiffler ........................ 711/135
6,442,551 B1 * 8/2002 Ofek ............................ 707/204
6,543,001 B1 * 4/2003 LeCrone et al. ............... 714/4

* cited by examiner

*Primary Examiner*—Sam Rimell
(74) *Attorney, Agent, or Firm*—Staas & Halsey LLP (57) ABSTRACT

A database system which quickly creates a snapshot copy of the backup files. The system has a plurality of database storage subsystems which are normally operating as a mirrored storage system under the control of a mirroring controller. A write suspending unit temporarily suspends write operations to those storage subsystems, and a device detachment unit detaches at least one of the database storage subsystems from the mirrored storage system. A write restarting unit then allows write operations to the remaining database storage subsystems. A correction processor makes corrections to the detached database storage subsystem to resolve any inconsistency in its records, which might have been introduced in relation with such transactions that were in process at the time of the detachment. A data converter converts file location data for the detached database storage subsystem, so that it will serve as a separate database volume.

3 Claims, 12 Drawing Sheets

DATABASE SYSTEM WITH BACKUP AND RECOVERY MECHANISMS

BACKGROUND OF THE INVENTION

1. Field of the Invention

The present invention relates to a database system, and particularly to a database system constructed with a plurality of database storage subsystems.

2. Description of the Related Art

Computers play a crucial role in today's business environments. Take a computing system in a bank, for example. Most business transactions are conducted through the online services provided by the bank's computing system, and their records are collected and processed by some appropriate accounting programs at predetermined intervals (e.g., on a daily basis). A conventional way to achieve this is to stop the online services temporarily and allow the accounting system to make full access to the business databases. Such business computing systems must also provide high availability. To this end, backup-taking tasks should be included in their daily maintenance activities, protecting the system against the potential risk of hardware failures. Regular backup enables quick recovery of the database in the event of a system failure.

In recent years, it is not unusual for banks to offer their online services 24 hours a day, 7 days a week. The provision of such nonstop services, however, poses various difficulties in the operations and maintenance of bank computing systems. One of the biggest problem in this new environment is that computing systems have no chance to stop their main services for the purpose of time-consuming daily accounting and backup operations. That is, there is a need for an improved processing mechanism that enables regular accounting and backup tasks to be made without interrupting online facilities for the customers.

SUMMARY OF THE INVENTION

Taking the above into consideration, an object of the present invention is to provide a database system which enables nonstop online services, while allowing regular accounting and backup operations.

To accomplish the above object, according to the present invention, there is provided a database system which employs a plurality of database storage subsystems. This database system comprises the following elements: a mirroring controller which makes the plurality of database storage subsystems operate as a mirrored storage system; a write suspending unit which temporarily suspends write operations to the plurality of database storage subsystems; a device detachment unit which detaches at least one of the database storage subsystems from the mirrored storage system; and a write restarting unit which restarts the write operations to the remaining database storage subsystems.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
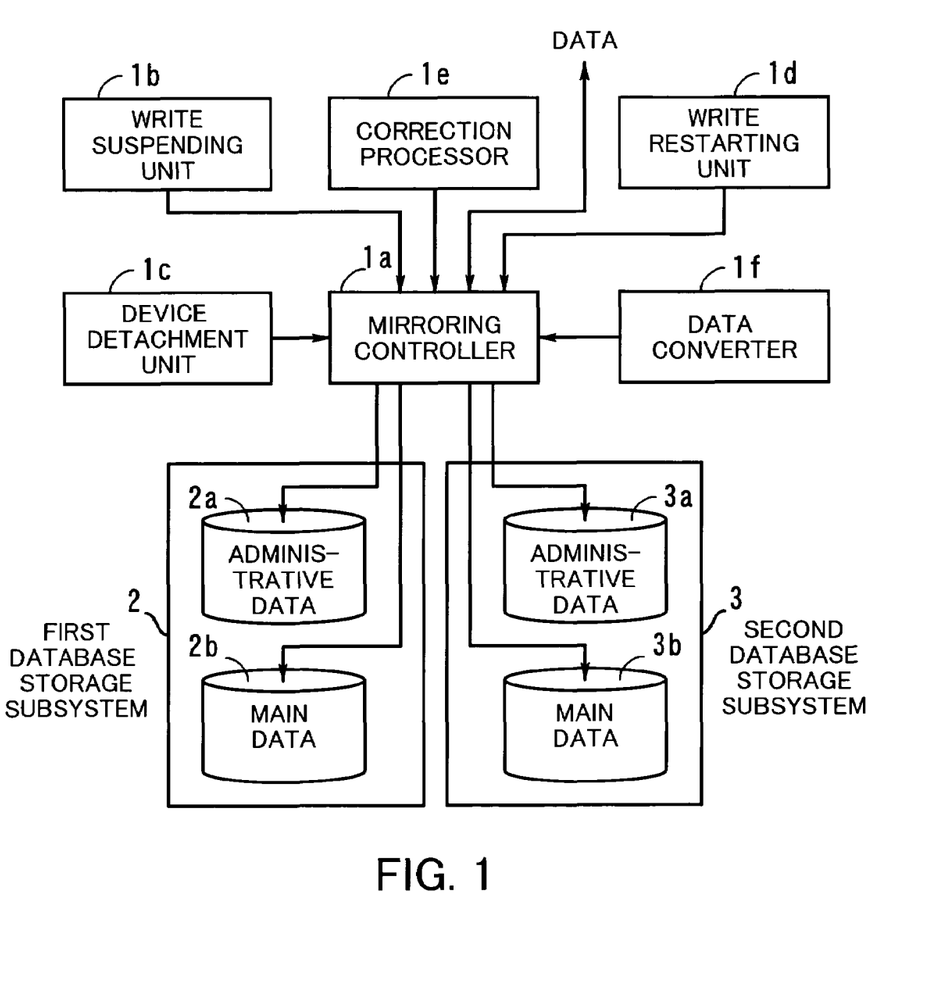
FIG. 1 is a conceptual view of a database system according to the present invention.

FIG. 1 is a conceptual view of a database system according to the present invention. To provide high availability, this database system employs two groups of storage volumes, which are referred to herein as "database storage subsystems" 2 and 3. The first database storage subsystem 2 actually has two physical or logical storage devices 2b and 2a for storing substantive database records ("main data") and their associated administrative data, respectively. Similarly, the second database storage subsystem 3 comprises two physical or logical storage devices 3b and 3a for storing main data and its associated administrative data. According to the present invention, those two database storage subsystems 2 and 3 are controlled by the following functional elements: a mirroring controller 1a, a write suspending unit 1b, a device detachment unit 1c, a write restarting unit 1d, a correction processor 1e, and a data converter 1f.

The mirroring controller 1a controls data mirroring between the two database storage subsystems 2 and 3, thus making them function as a single mirrored storage system. The write suspending unit 1b temporarily suspends write operations to the database storage subsystems 2 and 3. The device detachment unit 1c detaches one of the database storage subsystems 2 and 3. Consider, for example, that the second storage subsystem 3 is detached. The write restarting unit 1d restarts write operations to the remaining database storage subsystem 2 after the second database storage subsystem 3 has been detached. The correction processor 1e makes corrections to the detached first database storage subsystem 3 to resolve any inconsistency in its records, which might have been introduced in relation with such transactions that were in process at the time of the detachment. The data converter 1f converts file location data for the detached database storage subsystem 3, so that the detached second database storage subsystem 3 will serve as a separate database volume.

The database system of FIG. 1 operates as follows. In normal operation, the two database storage subsystems 2 and 3 act as a single mirrored storage system, under the management of the mirroring controller 1a. This state is referred to as the "mirrored mode," where the records stored in one database storage subsystem is always an exact copy of the other's.

When, for example, an accounting operation is necessitated, the above storage system migrates from mirrored mode to split mode, where the second database storage subsystem 3 is detached as a database snapshot for use in the accounting processing. This migration to the split mode is achieved as follows. First, the write suspending unit 1*b* temporarily inhibits write access to the mirrored database storage subsystems 2 and 3 to prevent the database from being affected by the detachment of storage devices. Then the device detachment unit 1*c* commands the mirroring controller 1*a* to disable its mirroring functions, thus separating the second database storage subsystem 3 from the first database storage subsystem 2. As a result, the two database storage subsystems 2 and 3 enters the split mode. Subsequently, the write restarting unit 1*d* restarts write access to the database storage subsystem 2, allowing new transactions to modify the records in the first database storage subsystem 2.

The detached database storage subsystem 3, on the other hand, is isolated from any database transactions because its contents should be preserved as a snapshot image of the database. This database snapshot, however, may contain some inconsistency introduced at the time of detachment, due to the presence of ongoing transactions that had not been committed at that time point. While those transactions might have produced some additional updates, they are not included in the snapshot because no further write operations have been allowed since the detachment. The correction processor 1*e* checks and corrects such inconsistency in the detached database storage subsystem 3.

When the correction is made, the data converter 1*f* manipulates the administrative data stored in the storage device 3*a* in order to prevent the snapshot records from overlapping with like data objects in the other database storage subsystem. More specifically, this processing includes renaming of data files and conversion of file location data.

The above processing finally yields a complete snapshot of the database sampled at the time of detachment. This snapshot can now be handled as an independent database, since the data converter 1*f* has conducted data renaming and location data conversion for that purpose. It is therefore possible to execute accounting jobs with the obtained snapshot, while continuously providing their customers with online services.

Figure 2:
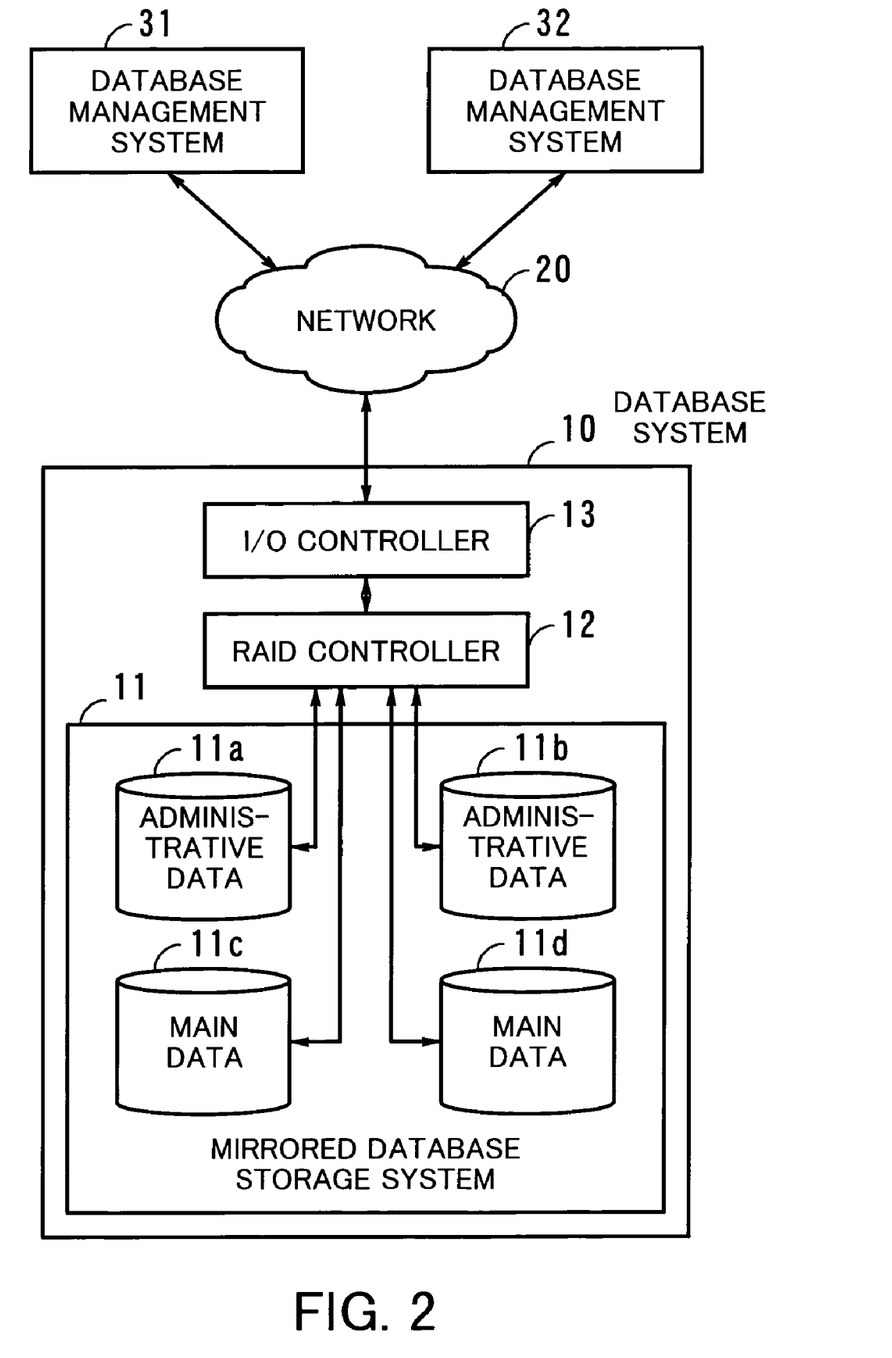
FIG. 2 is a block diagram of a first embodiment of the present invention.

Referring next to FIG. 2, a more specific embodiment of the present invention will be described. FIG. 2 is block diagram of a first embodiment of the present invention. This system comprises a database system 10, a network 20, and database management systems 31 and 32. The database system 10 comprises a database storage system 11, a RAID controller 12, and an Input/Output (I/O) controller 13, where the term "RAID" stands for a "Redundant Array of Inexpensive Disks."

The database storage system 11 consists of four storage devices 11*a* to 11*d*. The first two storage devices 11*a* and 11*b* hold administrative data, which includes various log records, file location data, and other various files for data management purposes. The second two storage devices 11*c* and 11*d* store substantive data objects that are written or retrieved in database transactions.

The RAID controller 12 is implemented as software and/or hardware functions to realize the data mirroring between the storage devices 11*a* and 11*b*, as well as between the storage devices 11*c* and 11*d*. Just as the storage devices 11*a* and 11*b* contain the same administrative data, so do the other mirrored pair 11*c* and 11*d* for database records. The I/O controller 13, on the other hand, controls the data flow to/from the database system 10. The network 20 is configured as a Storage Area Network (SAN), interconnecting the database system 10 and database management systems 31 and 32. For operations and management of the database system 10, the database management systems 31 and 32 are implemented on mainframe computers or other open system platforms (i.e., servers).

The above-described first embodiment will operate as follows. Suppose here that the database system 10 is currently managed by the database management system 31, and that the database storage system 11 is operating in the mirrored mode under the control of the RAID controller 12. In the course of online database transactions, records are created and accumulated in the database storage system 11, each piece of data being duplicated in the mirrored storage devices 11*a* and 11*b*, as well as in the storage devices 11*c* and 11*d*. While the system must always be available to the customers, the records in the database should be retrieved in its entirety and subjected to an accounting process at predetermined intervals. The embodiment satisfies these requirements by detaching one storage subsystem from the database transactions and forming it into a snapshot of the database. The details of this processing will be described below.

Figure 3:
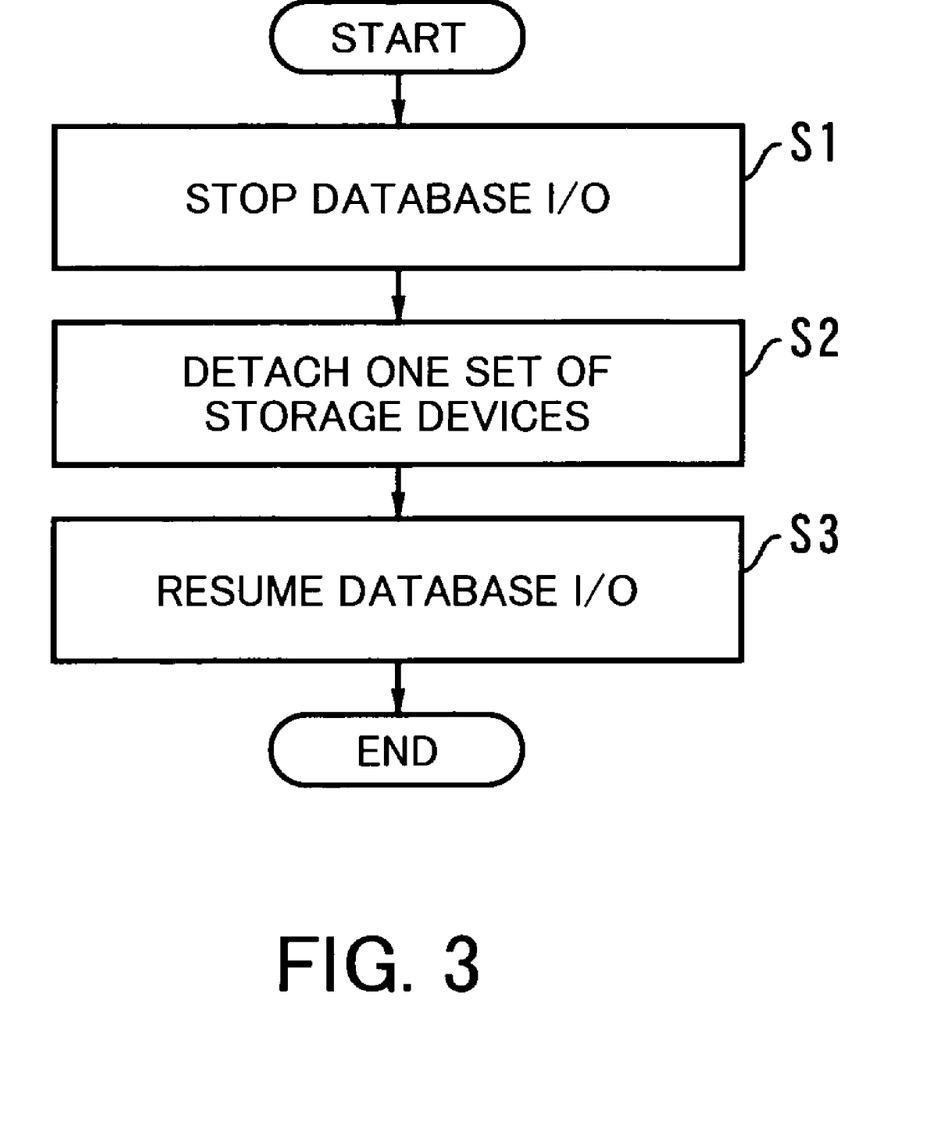
FIG. 3 is a flowchart showing a process of detaching one of the database storage subsystems that have been operating in mirrored mode.

FIG. 3 is a flowchart of a process which detaches one set of storage devices 11*b* and 11*d* which have been serving as part of the mirrored database storage system 11. This process comprises the following steps.

(S1) The database management system 31 commands the database system 10 to temporarily stop the operation of its I/O controller 13, thus inhibiting the database storage system 11 from accepting write access. As an alternative method, the stop command may be issued by the RAID controller 12.

(S2) The database management system 31 commands the database system 10 to terminate the mirrored mode of the database storage system 11, thus separating the second set of storage devices 11*b* and 11*d* from the first set of storage devices 11*a* and 11*c*. To maintain the consistency between administrative data and main data, the two storage devices 11*b* and 11*d* should be detached at the same time.

(S3) The database management system 31 commands the database system 10 to resume the operation of its I/O controller 13. Since the second set of storage devices 11*b* and 11*d* have already been detached logically, further database transactions are directed only to the first set of storage devices 11*a* and 11*c*.

Figure 4:
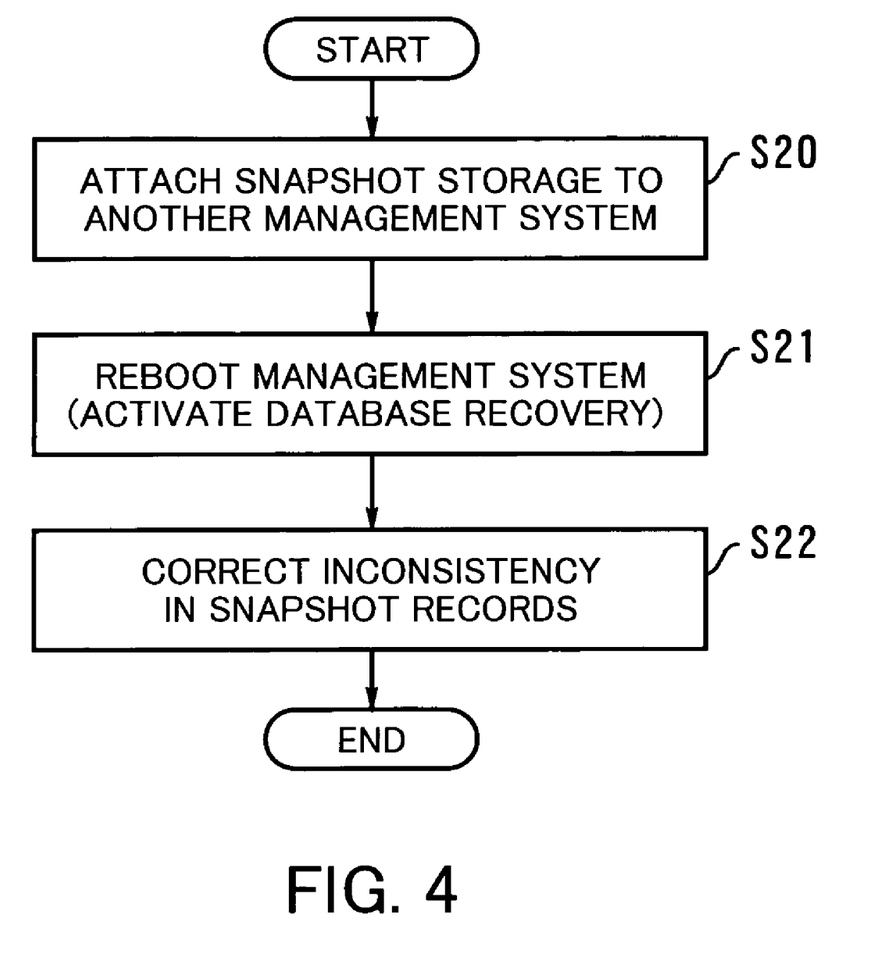
FIG. 4 is a flowchart showing a process of attaching the separated storage subsystem to another database management system.

Now that the storage devices 11*b* and 11*d* are decoupled from the mirroring mechanism as a result of the above three processing steps, another process is then invoked to attach them to the other database management system 32. FIG. 4 is a flowchart showing this process, where the term "source database" refers to the original database in the storage devices 11*a* and 11*c*, and the term "database snapshot" refers to what is stored in the detached storage devices 11*b* and 11*d*.

(S20) The storage devices 11*b* and 11*d* are attached logically to the database management system 32. Step S20 involves an appropriate setup operation to make the file location data accessible with the same access names as those in the source database. This setup eliminates the need for converting the file location data, simplifying the later processing.

(S21) The database management system 32 is rebooted.

(S22) The rebooting operation at step S21 activates the data recovery function in the database management system 32. During this process, the result of every transaction that was active at the time of the storage device detachment (S1–S3) is reflected in the database snapshot. This issue will be discussed in the next paragraph.

Generally, business database systems have an automatic data recovery mechanism to minimize the system downtime in case of power failures or other events. This mechanism is essential in the online transaction systems because an interruption of ongoing transactions in such a problem situation would introduce inconsistency into their databases, making further services impossible. To solve the problem, the database recovery mechanism is designed to correct inconsistent records by using before-image log records stored as part of its administrative data volume. In the case of the proposed database system, there may have been some active transactions when the storage devices 11b and 11d were detached, which should not be included in the snapshot. The present invention takes advantage of the above-described database recovery function to avoid possible data inconsistency problems in the produced database snapshot.

Figure 5A:
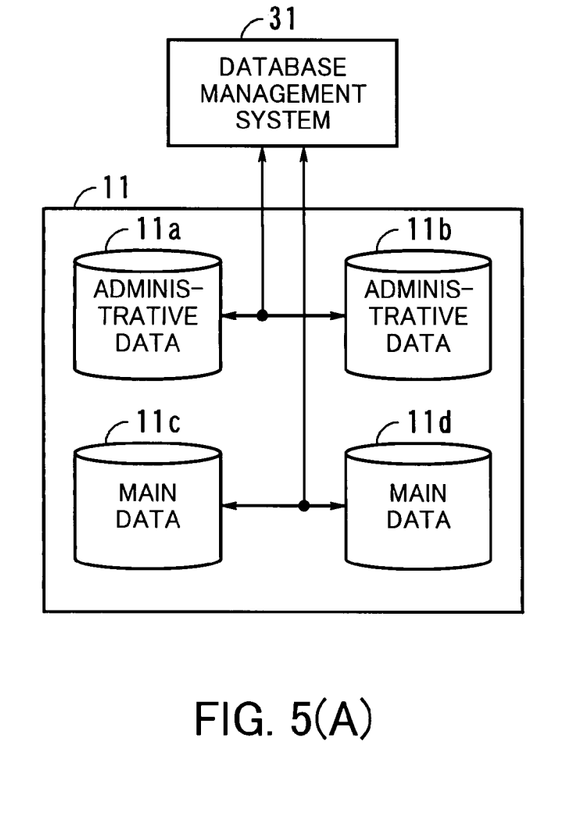
FIGS. 5(A) and 5(B) show how the system reconfigures itself through the process described in FIGS. 3 and 4.
Figure 5B:
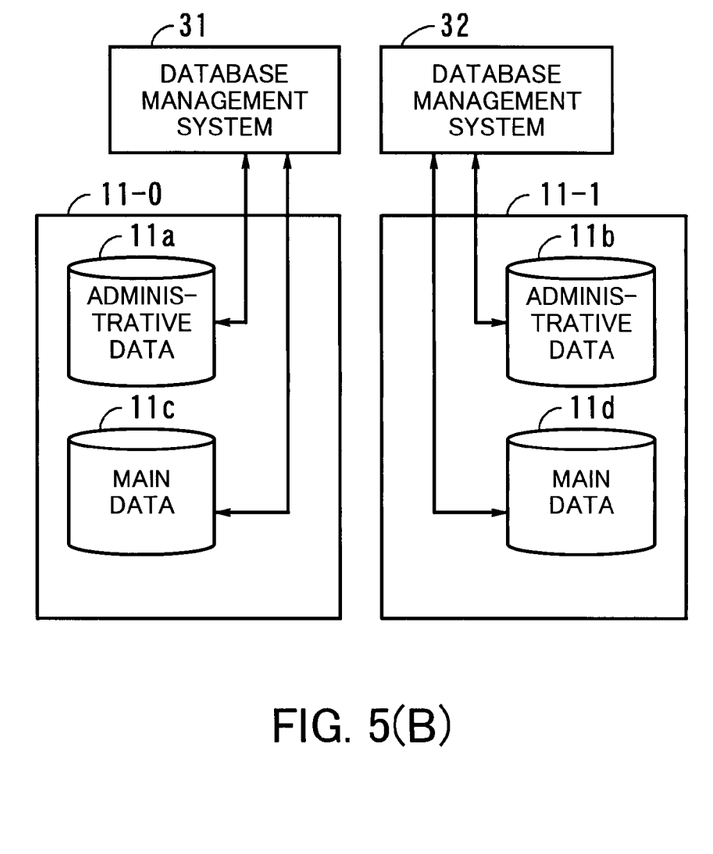

FIGS. 5(A) and 5(B) depict how the proposed database system has reconfigured itself through the above processing steps. FIG. 5(A) schematically shows the original state of the system, in which the storage devices 11a to 11d are operating in normal mirrored mode under the control of the RAID controller (not shown), and the database management system 31 manages the database system 10. The system then reforms itself by executing the above-described steps S1 to S3 and S20 to S22. The result is depicted in FIG. 5(B), where the database storage system 11 is split into two halves. One is referred to as a source database 11-0, which continues working under the management of the database management system 31. The other is a database snapshot 11-1, which is attached to another database management system 32 and used as a separate database after rebooting.

As have been described above, the first embodiment of the present invention quickly provides a snapshot copy of the database by separating one of the database storage systems that have been operating in mirrored mode. If there were active transactions at that time, the proposed system corrects their relevant records, so that no inconsistency will remain in the resulting database snapshot. The first embodiment makes such corrections by taking advantage of an automatic failure recovery mechanism that is inherent in the database system.

Figure 6:
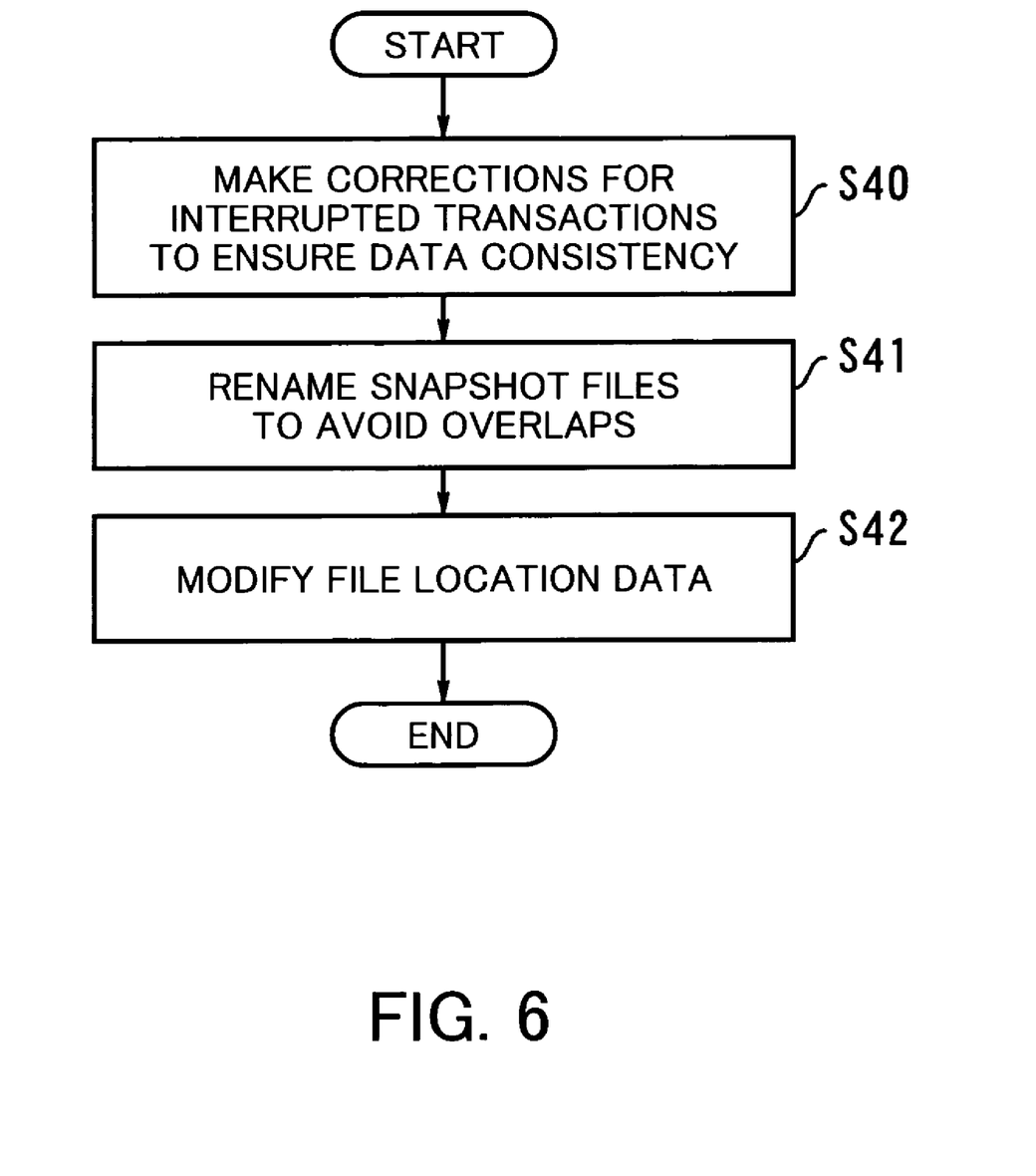
FIG. 6 is a flowchart showing the operation of a second embodiment of the present invention.

Referring next to the flowchart of FIG. 6, a second embodiment of the present invention is shown. As in the above-described first embodiment, the database system executes the process of FIG. 4 to split its storage system into halves. After that, according to the second embodiment, the system executes the following steps in whatever order.

(S40) The database management system 31 makes appropriate corrections about the transactions interrupted at the time of the database splitting, in an attempt to ensure the consistency of database records. More specifically, there might have been some ongoing transactions when the storage devices 11b and 11d were separated from their counterparts. The database management system 31 corrects the records of such incomplete transactions, if any, based on a before-image log which is stored in the storage device 11a as part of the administrative data. This operation removes inconsistent records from the database.

(S41) The database management system 31 renames the database snapshot files as required, thereby avoiding overlaps with the source database files in their names.

(S42) The database management system 31 modifies file location data in the database snapshot, as required, thus making the database snapshot distinguishable from the source database.

Figure 7A:
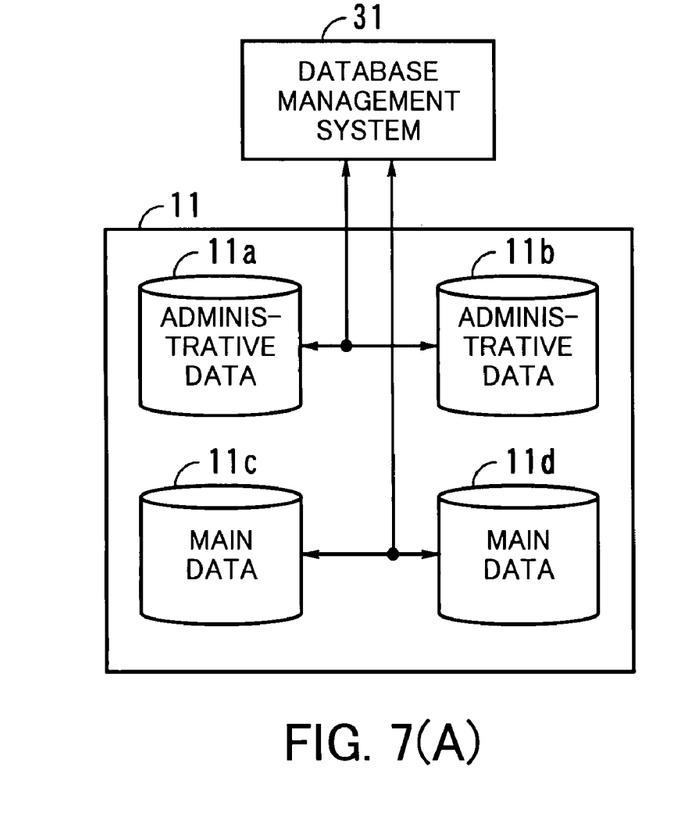
FIGS. 7(A) and 7(B) show how the system reconfigures itself through the process described in FIG. 6.
Figure 7B:
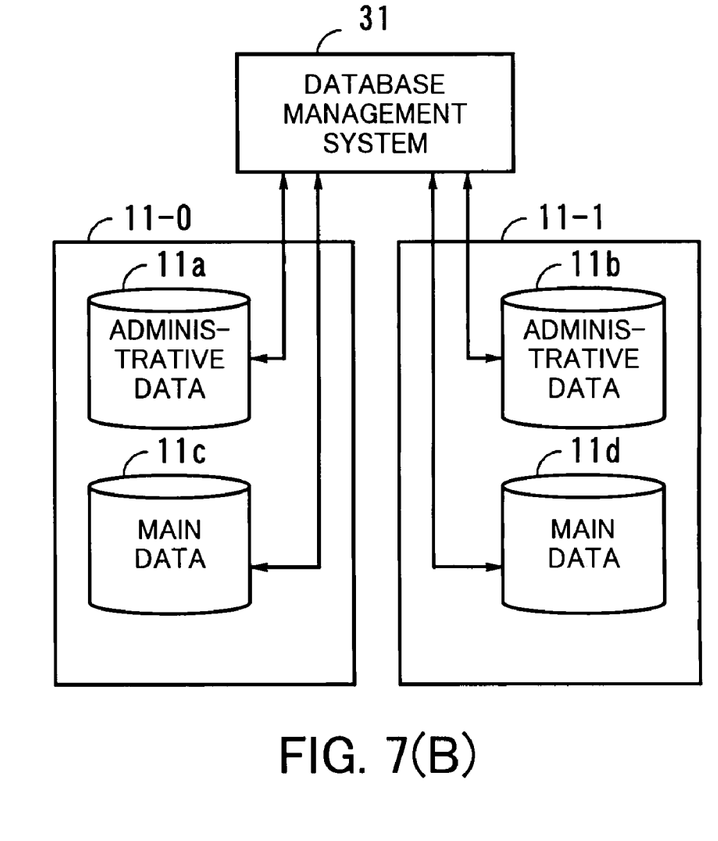

FIGS. 7(A) and 7(B) are simplified diagrams which show the system configurations before and after the execution of steps S40 to S42, respectively. Compare these diagrams with FIGS. 5(A) and 5(B) of the first embodiment. Unlike those in the first embodiment, the source database 11-0 and database snapshot 11-1 in the second embodiment are managed by a single database management system 31. While having the same data contents, the source database 11-0 and database snapshot 11-1 can now be viewed as separate volumes, since the file names and allocation data in the database snapshot 11-1 are different from those in the source database 11-0.

As seen from the above description, the second embodiment of the present invention quickly provides a snapshot of a database by separating one of the storage subsystems that has been operating as part of a mirrored database volume and then modifying it file names and allocation data as required. The obtained database snapshot is ready to be processed by an accounting system, since it can be handled as a separate database volume being independent of its source database.

Figure 8:
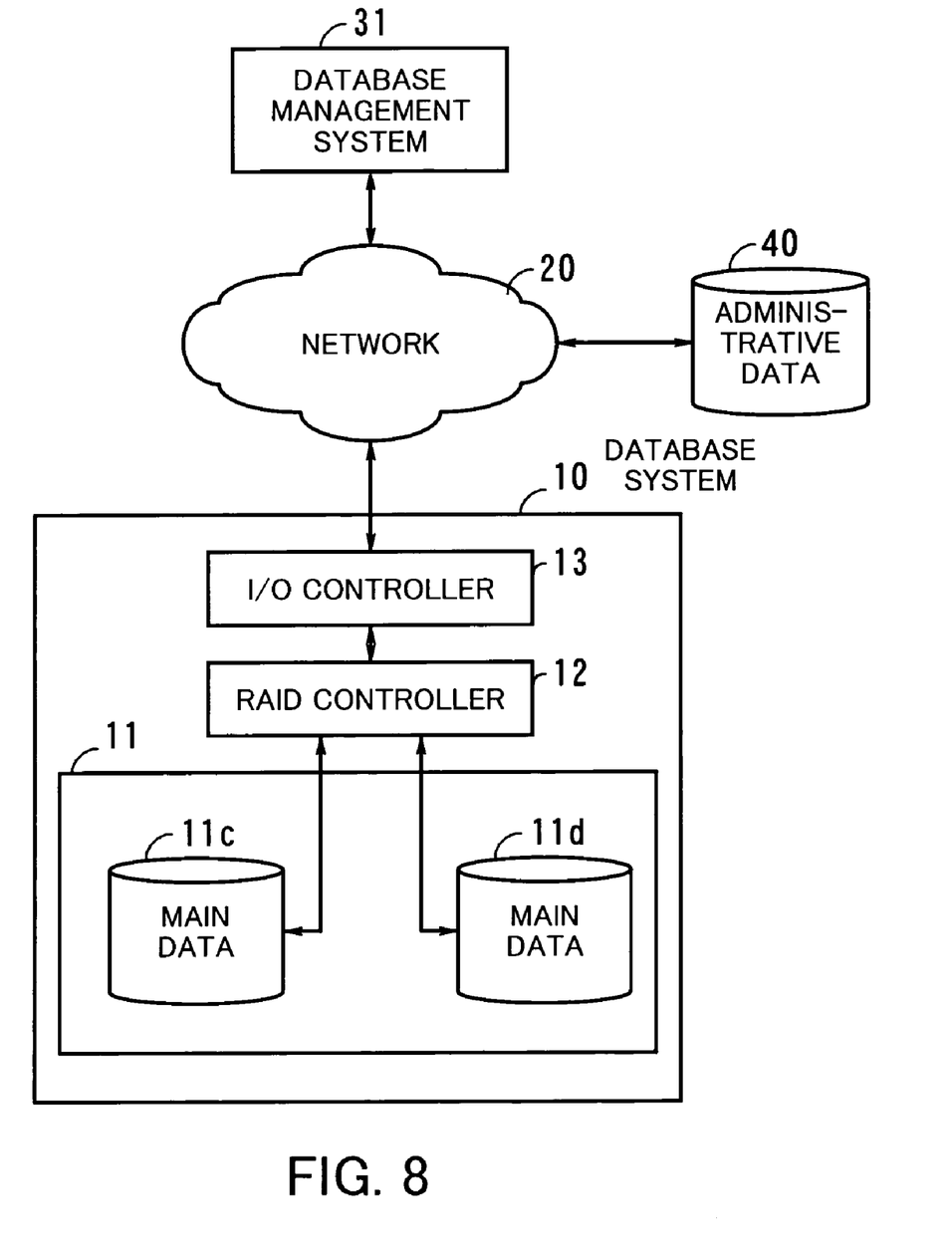
FIG. 8 is a block diagram of a third embodiment of the present invention.

Referring next to FIG. 8, a third embodiment of the present invention will be described. This third embodiment is similar to some extent to the system described earlier in FIG. 2, where like elements have like reference numerals. Unlike the preceding two embodiments, however, the third embodiment stores administrative data in a separate storage device 40 on the network, separately from the database storage system 11. Another difference is that the second database management system 32 is not present in the system of FIG. 8.

Figure 9:
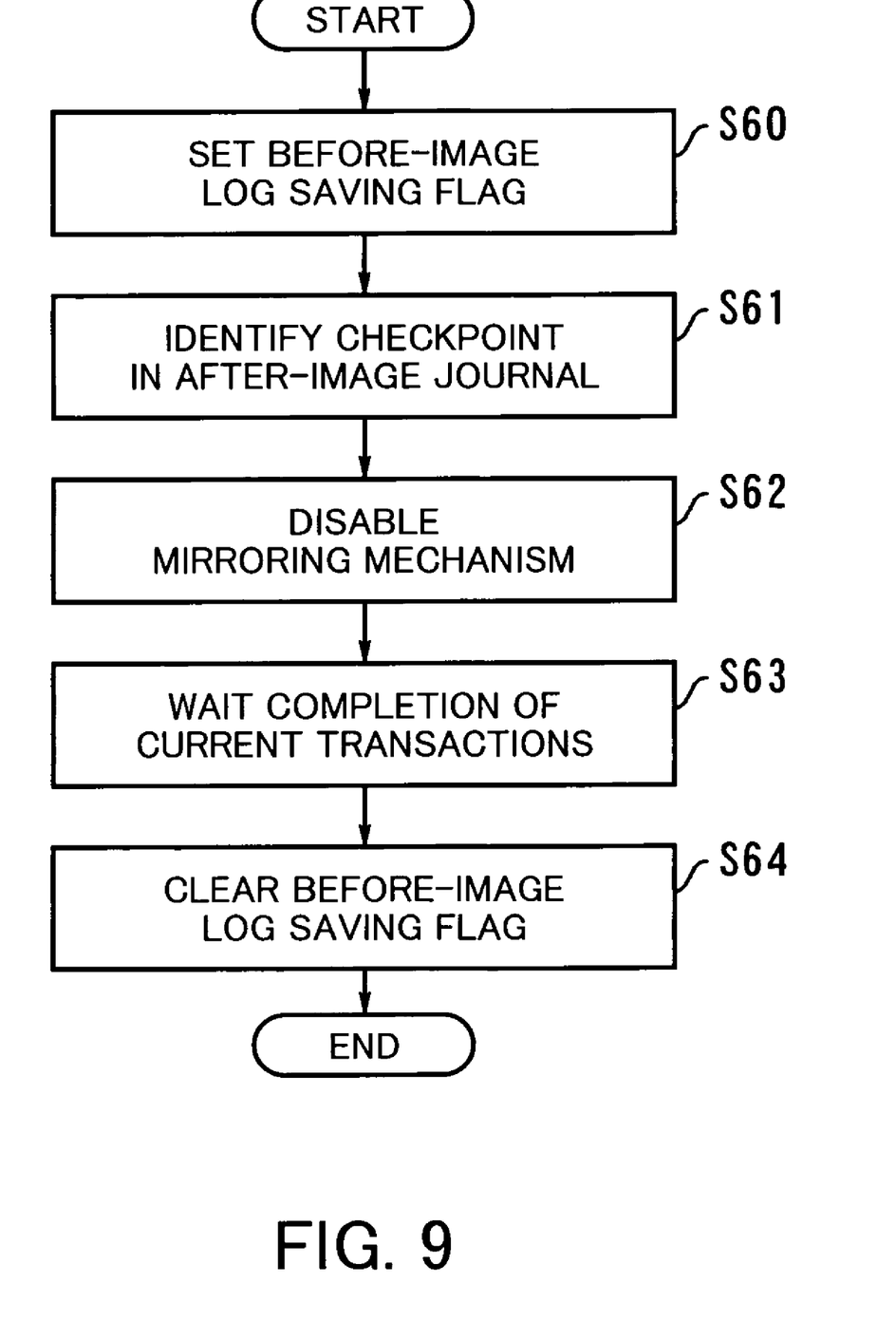
FIG. 9 is a flowchart showing a process which produces a backup database by splitting the database storage devices that have been operating in mirrored mode.

More specifically, according to the third embodiment, one of the mirrored storage devices 11c and 11d is split from its counterpart and used as the backup storage. When a failure occurs at the remaining storage device, the system restores the lost records from that backup. FIG. 9 is a flowchart showing an example process which produces a backup copy by splitting a database storage device that has been operating as part of a mirrored storage system. This process comprises the following steps.

(S60) The database management system 31 sets a before-image log saving flag. The term "before-image" refers to a copy of a database record before a modification is made. This term contrasts with the term "after-image," which refers to a copy of a record after a modification is made as a result of a database transaction. Normally, a before-image log record is created for a temporary backup during each transaction, and therefore, it can be discarded when the transaction is completed. In the present embodiment, however, the system needs before-image logs for use in a rollback operation (described later). To preserve the necessary before-image information, the proposed system saves it in the after-image log file. The before-image log saving flag indicates the activation of such special log processing. When this flag is set, the storage device 40 records both before and after images.

(S61) The database management system 31 scans the after-image log to identify a specific point in the log sequence at which it is ensured that all the updates of preceding transactions conducted by the database management system 31 are written in the main data storage devices 11c and 11d. This point is referred to herein as the "last checkpoint."

(S62) The database management system 31 commands the RAID controller 12 to disable its mirroring function and separate the storage device 11d from the database.

(S63) The database management system 31 waits until the current transactions are completed. This waiting step is required because the before-image log saving flag must not be cleared until all ongoing transactions are finished and their logs and other related data objects are written. Otherwise, before-image logs of a transaction would be discarded upon commitment of that transaction, which makes it impossible to restore the database in the event of a failure.

(S64) The database management system 31 clears the before-image log saving flag.

The above steps S60 to S64 creates a backup copy of the database by detaching the storage device 11d from the mirrored database storage system. These steps also save before-image log records, together with after-image logs, regarding the transactions that were active at the moment of the storage device detachment. With those before-image logs, those transactions can be rolled back in a later database recovery process as described in the next section.

Referring to the flowchart of FIG. 10, a database recovery process will be described, assuming a failure of the storage device 11c. This recovery process comprises the following steps.

(S80) The database management system 31 restores the lost records in the working storage device 11c by copying a backup volume in the backup storage device 11d. It may also be possible to replace the failed storage device 11c with the backup storage device 11d, instead of copying data between them. While this alternative method saves the time for copying, it would be necessary to prepare another storage device for backup purposes.

Figure 10:
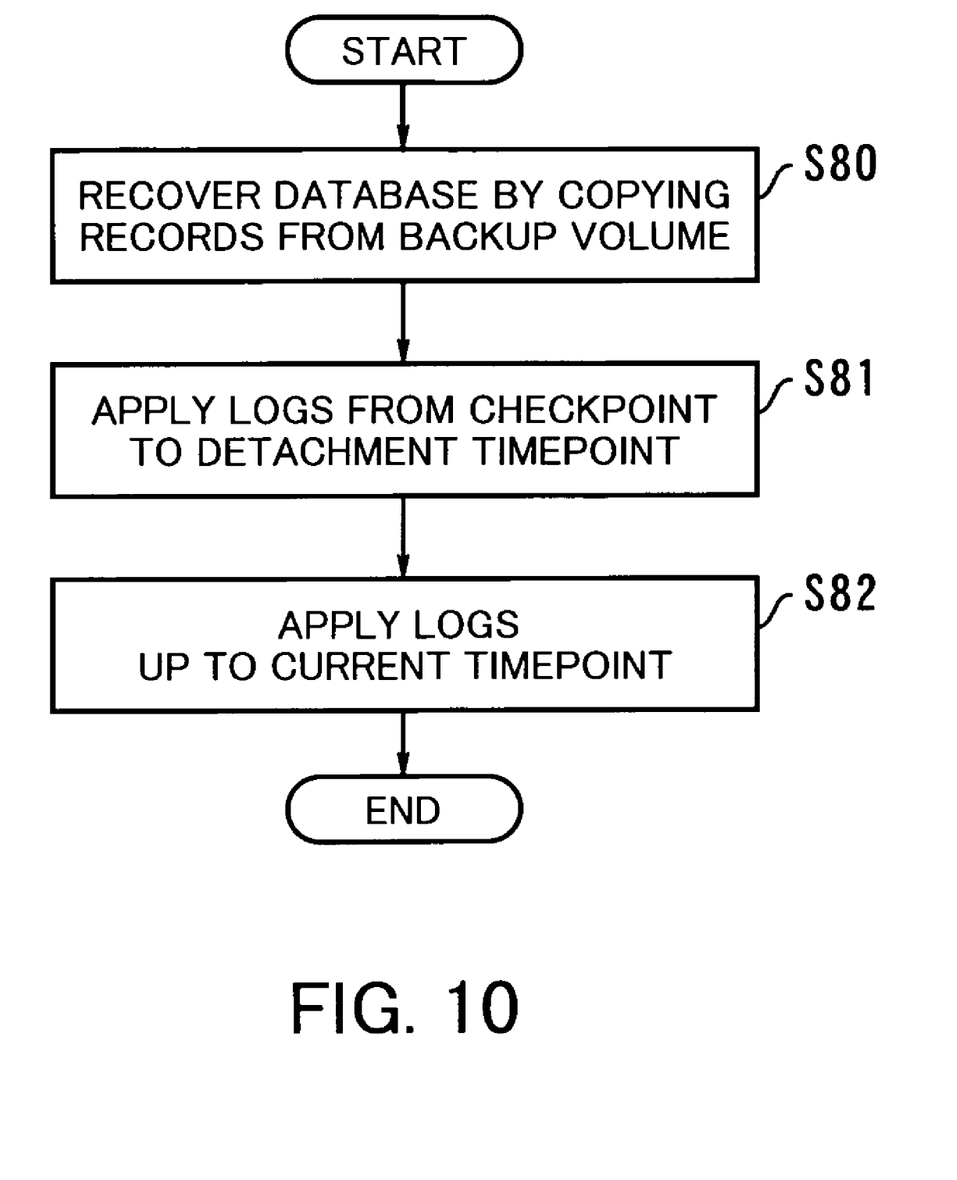
FIG. 10 is a flowchart of a database recovery process which is executed when one storage device has suffered a failure.

(S81) The database management system 31 applies the logged updates from the last checkpoint identified at step S61 of FIG. 10, up to the point where the detachment of the storage device 11d took place.

This recovery process reflects the result of in-flight transactions that were in process at the time of the storage device detachment. More specifically, the database management system 31 writes after-images for committed transactions, and before-images for non-committed (or aborted) transactions. In the database terminology, the former operation is called "rollforward," and the latter "rollback."

(S82) The database management system 31 further applies the remaining transaction logs up to the current timepoint, so that the data in the storage device 11c will be correctly updated with all the recent transaction results.

The above-described steps S60 to S64 (FIG. 9) and S80 to S81 (FIG. 11) enables the system to quickly create checkpoint records for backup, since the present embodiment is configured to use one of the mirrored storage devices as a backup volume. While the mirroring may be disabled in the middle of an active transaction, the proposed system has a mechanism to correct the consequent problem of data inconsistency, thus enabling a complete recovery of the database.

Figure 11:
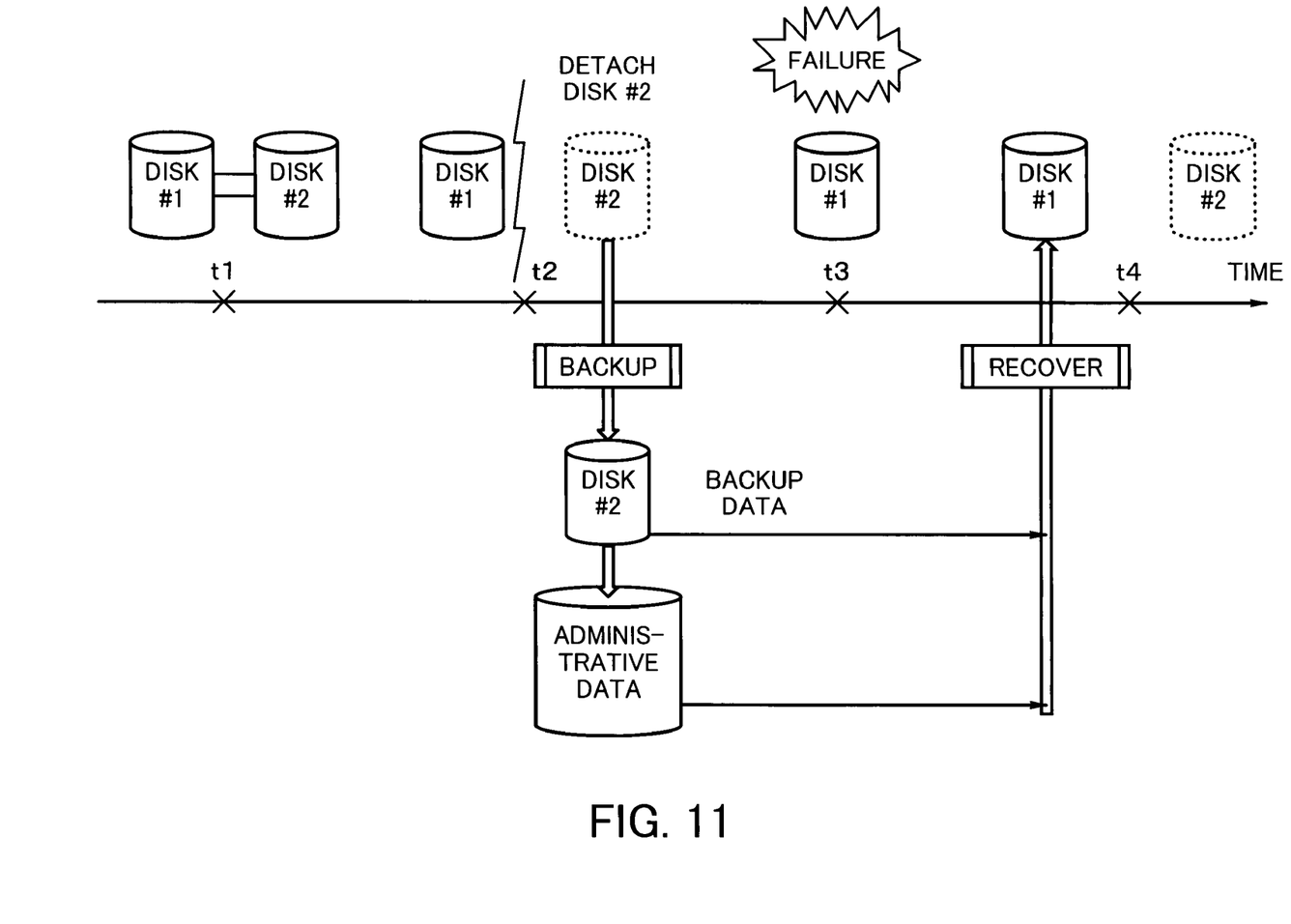
FIGS. 11 and 12 depict the scenario of FIG. 11.
Figure 12:
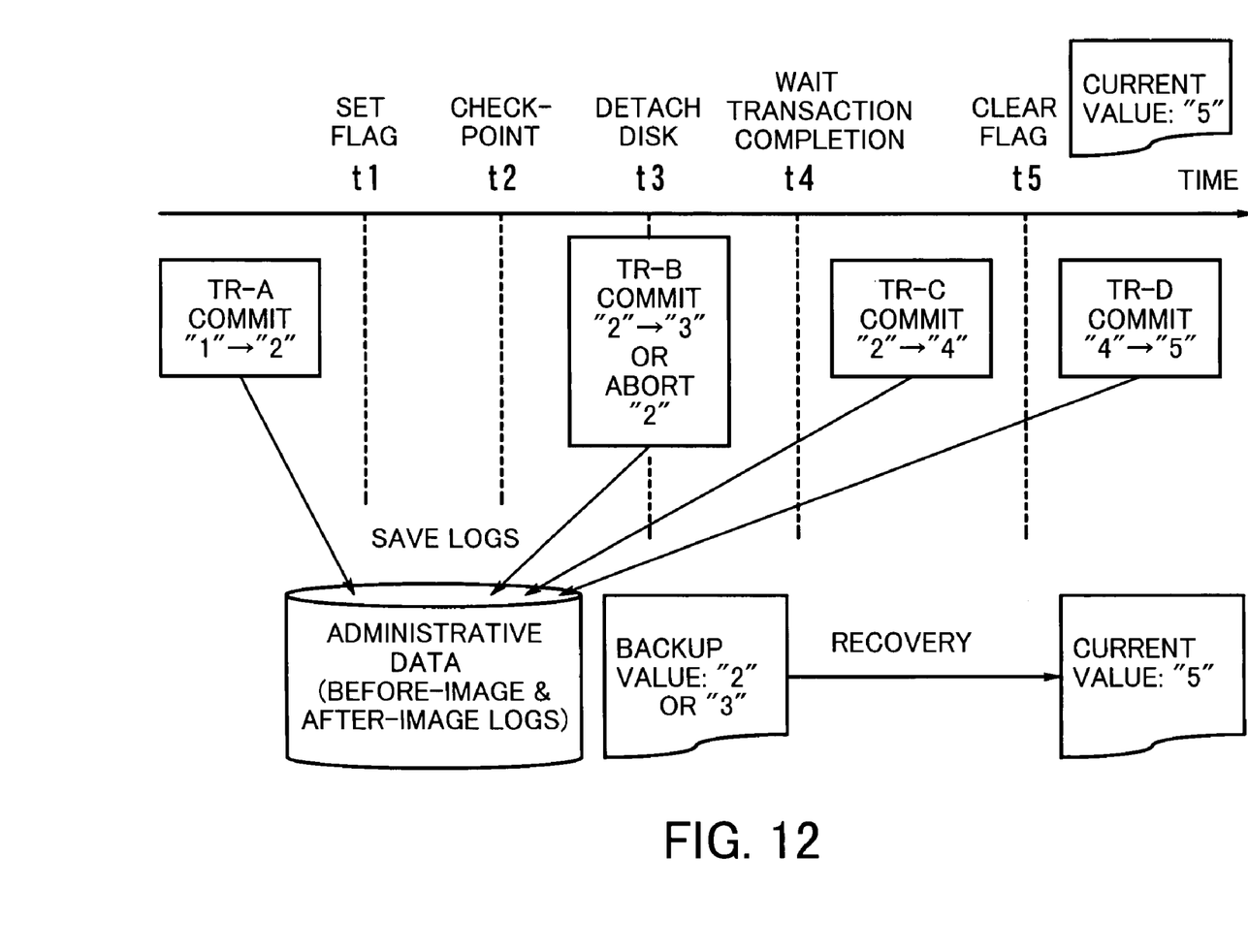

Referring lastly to FIGS. 11 and 12, the operation of the third embodiment will be described by way of example. FIG. 11 schematically shows how the usage of storage devices (disks #1 and #2) will change along the horizontal time line. Note that the disks #1 and #2 correspond to what have been described as the storage devices 11c and 11d in FIG. 8, respectively.

At time t1, the two disks #1 and #2 are operating as a mirrored pair, one containing the exact copy of the other's data. At time t2, the disk #2 is detached to make a database backup. If there are any transactions in process, the database system has to wait until all the necessary information (e.g., after-image and before-image logs) is written into the administrative data storage.

It is assumed that the working disk #1 encounters a failure at time t3. Then, at time t4, the system attempts to restore the lost data records of the disk #1 by using the backup records in the disk #2, together with the after-image and before-image logs retrieved from the administrative data storage. There should be no concern about potential data inconsistency in the disk #2, which might have been developed due to the presence of ongoing transactions during the preceding device detachment at time t2. This is because such inconsistency is corrected by the use of before-image log records, which are stored together with after-images after the completion of each such transaction.

FIG. 12 shows how the transaction logs are applied. Assume here that a transaction TR-A has been committed shortly before t1, changing the value of a certain database record from "1" to "2." This transaction is journaled as an after-image log, and it is saved into the administrative data storage.

At time t1, the process of disk detachment begins and a before-image log saving flag is set (step S60 of FIG. 9). At time t2, the database system identifies an appropriate checkpoint at which it is assured that the database contains all updates of committed transactions (step S61). At time t3, the system disables the mirroring mechanism, and detaches the storage device 11d (step S62). Suppose that there is an active transaction TR-B which has not been committed yet. The system waits its completion (i.e., commitment or abort) at time t4, accordingly (step S63). Here, the transaction TR-B may be committed, changing the aforementioned data record from "2" to "3." If this is the case, the latter value "2" is saved as its after-image. Or the transaction TR-B may be aborted. If so, the before-image "2" is recorded in the administrative data storage. As last, the administrative data storage acquires a log record with an after-image of "2" (when aborted) or "3" (when committed).

The system accepts yet another transaction TR-C, which changes the above record value from "2" to "4". This transaction TR-C is recorded with an after-image log. At time t5, the system clears the before-image log saving flag (step S64). Accordingly, later before-image logs will be handled in the previous way. After time t5, still another transaction TR-D changes the record value from "4" to "5."

In this way, a database backup is taken in the storage device 11d and later transactions are journaled in the administrative data storage. If a failure occurs in the working storage device 11c, the automatic recovery mechanism copies data from the backup storage device 11d to the working storage device 11c, and then retrieves the log records after the checkpoint from the administrative data storage. The retrieved logs are applied to the storage device 11c, thereby reconstructing the missing data up to the current point.

As seen from the above explanation, the proposed system can quickly create a backup copy of the database because it uses one half of the mirrored storage system. When a failure occurs at the remaining half, the system restores the lost records from the backup copy and recovers recent updates by applying transaction log records. Besides promptly recovering the database, it ensures the consistency and integrity of the stored records.

In the failure recovery process discussed above, the restoration of database records may not always be done for the entire database volume. It is also possible to copy a specific part of the database that was lost or damaged by the failure. This method will reduce the recovery time.

While the third embodiment has been described under the assumption that the system takes a backup of its database disk, but not of the administrative data storage, it is not intended to limit the scope of the invention to that specific configuration. It is also possible to create a backup of administrative data in the same way, allowing the recovery of the administrative data storage.

The proposed processing mechanisms are actually implemented as software functions of a computer system. The process steps of the proposed database system are encoded in a computer program and stored in a computer-readable storage medium. The computer system executes this program to provide the intended functions of the present invention. Suitable computer-readable storage media include magnetic storage media and solid state memory devices. Other portable storage media, such as CD-ROMs and floppy disks, are particularly suitable for circulation purposes. Further, it will be possible to distribute the programs through an appropriate server computer deployed on a network. The program file delivered to a user is normally installed in his/her computer's hard drive or other local mass storage devices, which will be executed after being loaded to the main memory.

The above discussion is summarized as follows. According to one aspect of the present invention, the database system has a plurality of database storage subsystems normally operating in mirrored mode. Write operations to the database is stopped temporarily, during which one of the mirrored pair is separated from its counterpart. After that, the write operations are allowed to resume. With this feature, the system can quickly creates a snapshot copy of the database.

According to another aspect of the invention, the system finds a checkpoint at which it is ensured that all updates of preceding transactions are written in the mirrored database storage subsystems. It then splits one of those storage subsystems, and waits for the completion of active transactions while saving log records at the time of the detachment. This mechanism allows the system to restore lost records from the detached storage subsystem in the event of database failures.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a program which controls a database system employing a first and second database storage subsystems, the program causing a computer system to function as:

mirroring means for making the first and second of database storage subsystems operate as a mirrored storage system;

flag setting means for setting a before-image log saving flag that requests before image log records to be saved in addition to after image log records;

checkpoint finding means for finding a checkpoint at which it is ensured that all updates of preceding transactions are written in the database storage subsystems;

detaching means for disabling said mirroring means and detaching the second database storage subsystem from the mirrored storage system after the before image log saving flag is set and the checkpoint is found;

waiting means for waiting for the completion of such transactions that were in process at the time of the detachment;

flag clearing means for clearing the before-image log saving flag to stop saving before image log records after said waiting means has finished said waiting operation; and logging means for creating and storing log records including before-image and after-image logs at the time of the detachment, according to the before-image log saving flag set and cleared by said flag setting means and flag clearing means, respectively.

2. A database system having a first and second database storage subsystems, comprising:

mirroring means for making the first and second database storage subsystems operate as a mirrored storage system;

flag setting means for setting a before-image log saving flag that requests before image log records to be saved in addition to after image log records;

checkpoint finding means for finding a checkpoint at which it is ensured that all updates of preceding transactions are written in the database storage subsystems;

detaching means for disabling said mirroring means and detaching the second database storage subsystem from the mirrored storage system after the before-image logsaving flag is set and the checkpoint is found;

waiting means for waiting for the completion of such transactions that were in process at the time of the detachment;

flag clearing means for clearing the before-image log saving flag to stop saving before image log records after said waiting means has finished said waiting operation; and logging means for creating and storing log records including before-image and after-image log records at the time of the detachment, according to the before-image log saving flag set and cleared by said flag setting means and flag clearing means, respectively.

3. The database system according to claim 2, further comprising failure recovery means for recovering the first database storage subsystem from a failure by using the second database storage subsystem and the log records stored in said logging means.

* * * * *

UNITED STATES PATENT AND TRADEMARK OFFICE
CERTIFICATE OF CORRECTION

| | |
|---|---|
| PATENT NO. | : 7,031,986 B2 |
| APPLICATION NO. | : 09/815055 |
| DATED | : April 18, 2006 |
| INVENTOR(S) | : Atsuki Ito |

It is certified that error appears in the above-identified patent and that said Letters Patent is hereby corrected as shown below:

Column 10, line 40, change "logsaving" to --log saving--.

Signed and Sealed this

First Day of August, 2006

JON W. DUDAS
*Director of the United States Patent and Trademark Office*